US012728516B2

(12) United States Patent
Shi et al.

(10) Patent No.: US 12,728,516 B2
(45) Date of Patent: Sep. 8, 2026

(54) HAND TOOL WITH SLIDE ADJUSTMENT FOR LOCKING FLEXIBLE HEAD

(71) Applicant: Apex Brands, Inc., Apex, NC (US)

(72) Inventors: Minglin Shi, Shanghai (CN); Cheng Yang, Shanghai (CN); Yi-Hsiang Tseng, Taiwan (CN); Tsung-Hsien Shen, Taiwan (CN)

(73) Assignee: Apex Brands, Inc., Apex, NC (US)

( * ) Notice: Subject to any disclaimer, the term of this patent is extended or adjusted under 35 U.S.C. 154(b) by 461 days.

(21) Appl. No.: 18/272,127

(22) PCT Filed: Jan. 28, 2021

(86) PCT No.: PCT/CN2021/074127
§ 371 (c)(1),
(2) Date: Jul. 13, 2023

(87) PCT Pub. No.: WO2022/160172
PCT Pub. Date: Aug. 4, 2022

(65) Prior Publication Data
US 2024/0100682 A1 Mar. 28, 2024

(51) Int. Cl.
*B25G 1/06* (2006.01)
*B25B 23/00* (2006.01)
*B25G 3/38* (2006.01)

(52) U.S. Cl.
CPC .......... *B25G 1/063* (2013.01); *B25B 23/0028* (2013.01); *B25G 3/38* (2013.01)

(58) Field of Classification Search
CPC ..... B25B 23/0028; B25B 27/02; B25G 1/063; B25G 3/38
(Continued)

(56) References Cited

U.S. PATENT DOCUMENTS 857,163 A * 6/1907 Derby .................... B25G 1/063 81/177.9
1,182,652 A 5/1916 Davis
(Continued)

FOREIGN PATENT DOCUMENTS

CN 2734433 Y 10/2005
CN 2787385 Y 6/2006
(Continued)

OTHER PUBLICATIONS

International Search Report and Written Opinion from International Application No. PCT/CN2021/074127 mailed Mar. 18, 2021; all pages cited in its entirety.

*Primary Examiner* — Hadi Shakeri
(74) *Attorney, Agent, or Firm* — Burr & Forman

(57) ABSTRACT

A flexible interface (130) may operably couple a head portion (110, 210) and a shaft (120, 220) of a hand tool (100, 200). The flexible interface may include a retention assembly (160) and a locking assembly (150) including an actuator (152, 250, 250') defining a locked state and an unlocked state for the hand tool. In the unlocked state, an angle of the head portion may be pivotable relative to a pivot axis (225) substantially perpendicular to a direction of extension of the shaft and, in the locked state, the angle of the head portion is fixed. The actuator may be configured to move in a direction substantially perpendicular to the pivot axis to operate the locking assembly to transition between the locked state and the unlocked state, and configured to move in a direction substantially parallel to the pivot axis to operate the retention assembly to retain hand tool in the unlocked state. A hand tool comprising said flexible interface is also related.

18 Claims, 10 Drawing Sheets

(58) Field of Classification Search
USPC .............................................. 81/177.8, 177.9
See application file for complete search history.

(56) References Cited

U.S. PATENT DOCUMENTS

| | | | | |
|---|---|---|---|---|
| 1,615,169 | A * | 1/1927 | Ellis | B25B 13/481 81/177.8 |
| 2,705,897 | A | 4/1955 | Kentish | |
| 3,423,781 | A * | 1/1969 | Henson | A47L 13/24 24/651 |
| 4,581,959 | A | 4/1986 | Troiano | |
| 5,199,335 | A | 4/1993 | Arnold et al. | |
| 5,768,960 | A | 6/1998 | Archuleta | |
| 5,862,723 | A | 1/1999 | Rowlands | |
| 6,000,302 | A | 12/1999 | Chiang | |
| 6,167,787 | B1 * | 1/2001 | Jarvis | B25B 23/0021 81/177.8 |
| 6,186,034 | B1 | 2/2001 | Lamons | |
| 6,216,567 | B1 | 4/2001 | Hu | |
| 6,295,898 | B1 | 10/2001 | Hsieh | |
| 6,324,947 | B2 | 12/2001 | Jarvis | |
| 6,336,383 | B1 | 1/2002 | Hung | |
| 6,405,621 | B1 | 6/2002 | Krivec et al. | |
| 6,557,442 | B1 | 5/2003 | Owoc | |
| 6,848,344 | B2 | 2/2005 | Rocco | |
| 6,857,341 | B1 | 2/2005 | Cheng | |
| 6,871,569 | B1 | 3/2005 | Chen | |
| 6,886,429 | B1 | 5/2005 | Lee | |
| 6,957,600 | B2 | 10/2005 | Hu | |
| 6,993,998 | B1 | 2/2006 | Kao et al. | |
| 7,000,507 | B1 | 2/2006 | Lin | |
| 7,051,625 | B1 | 5/2006 | Lee | |
| 7,082,862 | B2 | 8/2006 | Lee | |
| 7,131,356 | B2 | 11/2006 | Lin | |
| 7,146,886 | B1 | 12/2006 | Wu | |
| 7,165,480 | B2 | 1/2007 | Lin | |
| 7,168,346 | B2 | 1/2007 | Lin | |
| 7,171,875 | B2 | 2/2007 | Hu | |
| 7,174,815 | B1 | 2/2007 | Hsieh | |
| 7,197,966 | B1 | 4/2007 | Hsieh | |
| 7,237,463 | B1 | 7/2007 | Lee | |
| 7,318,366 | B2 | 1/2008 | Lee et al. | |
| 7,497,148 | B2 * | 3/2009 | Stucky | B25H 3/006 81/177.8 |
| 7,509,893 | B2 | 3/2009 | Wu | |
| 7,841,262 | B1 | 11/2010 | Tsai | |
| 8,028,607 | B2 | 10/2011 | Lee et al. | |
| 8,276,485 | B1 | 10/2012 | Chen | |
| 8,474,350 | B2 | 7/2013 | Lee et al. | |
| 8,671,809 | B1 | 3/2014 | Chen | |
| 8,695,459 | B2 | 4/2014 | Lee et al. | |
| 8,850,932 | B2 | 10/2014 | Tsai | |
| 9,073,199 | B2 | 7/2015 | Hsieh | |
| 9,242,366 | B2 | 1/2016 | Liu | |
| 9,327,388 | B2 | 5/2016 | Chen | |
| 10,252,403 | B2 | 4/2019 | Chen | |
| 10,493,615 | B2 | 12/2019 | Liu | |
| 10,532,448 | B2 | 1/2020 | Huddy | |
| 2004/0177731 | A1 | 9/2004 | Chen | |
| 2008/0141833 | A1 | 6/2008 | Shen | |
| 2010/0107828 | A1 | 5/2010 | Huerta | |
| 2011/0072941 | A1 | 3/2011 | Tsai | |
| 2011/0226099 | A1 | 9/2011 | Chen | |
| 2016/0271767 | A1 | 9/2016 | Su | |
| 2017/0190029 | A1 | 7/2017 | Cuesta | |

FOREIGN PATENT DOCUMENTS

| | | | |
|---|---|---|---|
| EP | 1852222 | B1 | 7/2013 |
| TW | 1364346 | B | 7/1999 |
| TW | 1472408 | B | 1/2002 |
| TW | 1477361 | B | 2/2002 |
| TW | I568550 | B | 2/2017 |

* cited by examiner

FIG. 3A.
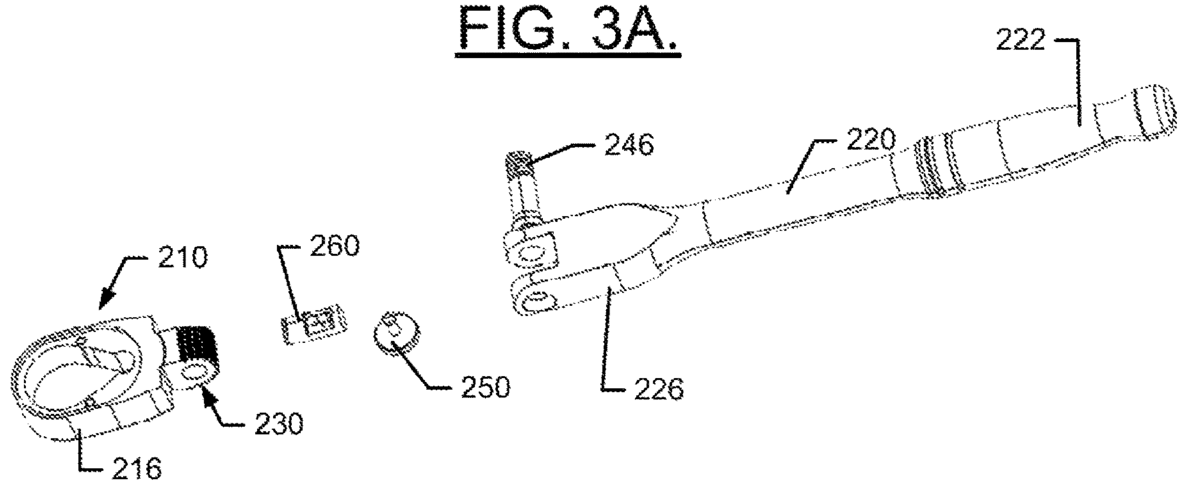
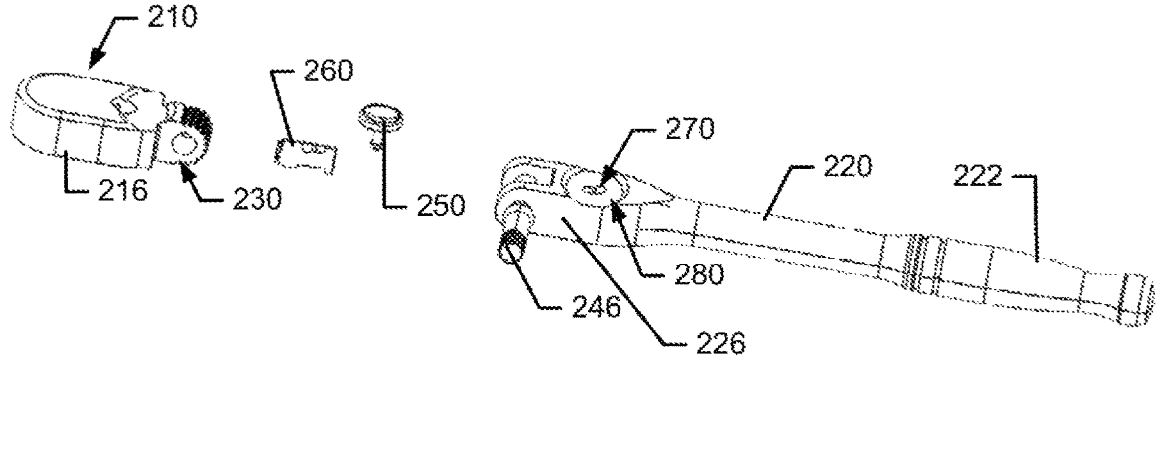
FIG. 3B.

FIG. 8A.
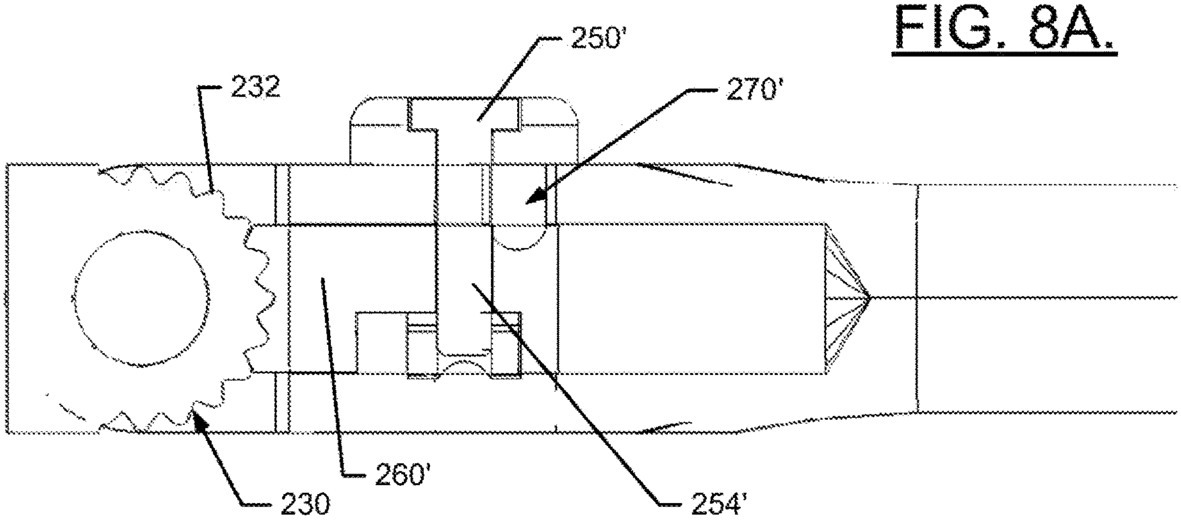
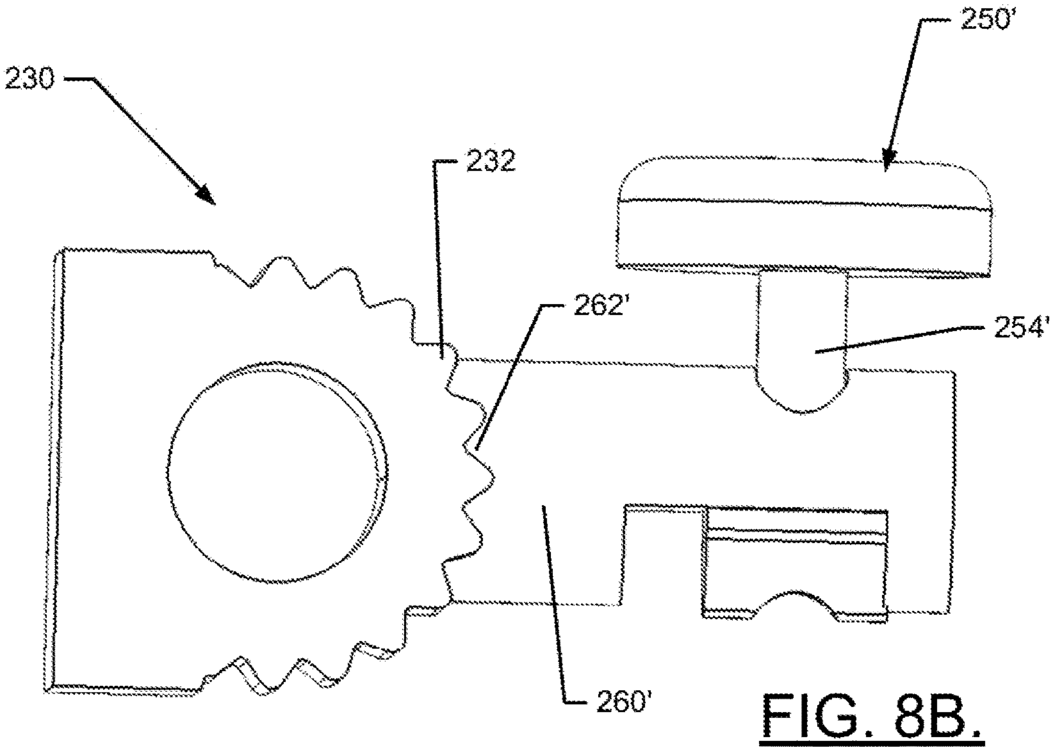
FIG. 8B.

HAND TOOL WITH SLIDE ADJUSTMENT FOR LOCKING FLEXIBLE HEAD

TECHNICAL FIELD

Example embodiments generally relate to hand tools and, in particular, relate to a ratchet, wrench or other hand tool having a flexible head that can be locked in either an adjusted position, or in an adjustable position.

BACKGROUND

Hand tools are commonly used across all aspects of industry and in the homes and workshops of consumers. Hand tools are employed for multiple applications including, for example, fastener tightening, component joining, and/or the like. For some fastener tightening applications, such as those involved in tightening of hex headed nuts or bolts, an open-end, box-end or combination wrench may be employed. Open-end wrenches typically have a head portion that has a U-shaped opening to grip opposing sides of the nut or bolt disposed at one or both ends of a shaft (or handle). Box-end wrenches instead have a head portion that has an enclosed opening to grip faces of the nut or bolt at one or both ends of the shaft. Meanwhile, combination wrenches have an open-end wrench head at one end and a box-end wrench head at the other end of the shaft.

Other types of wrenches are also possible, including wrenches that have a head portion configured with jaws that are adjustable relative to each other (e.g., to fit different sizes of fastener), or wrenches that have a head portion with a square drive configured to engage a socket. For some cases, in order to provide the ability to accurately apply torque, a class of hand tools referred to generally as torque wrenches have been developed. Torque wrenches are calibrated devices that enable the operator to know when a particular torque is reached. The means by which the operator is informed of the fact that the particular torque has been reached can vary with corresponding different types of torque wrenches.

For some of the different types of wrenches described above, ratcheting assemblies may be provided to enable the operator to continue to turn a fastener without removing and reorienting the wrench relative to the fastener. Such ratcheting assemblies are often placed in the head portion of box-end wrenches or wrenches configured to drive sockets. When a wrench employs a ratcheting assembly, the wrench may be referred to as a ratchet wrench or simply as a ratchet.

The head portions of many of the wrenches described above may be flared (e.g., angled relative to the longitudinal centerline of the shaft). However, having a fixed angle may be limiting in some case, thus some wrenches may be designed to be flexible (e.g., having a flexible head portion) to enable different angles to be achieved for the head portion relative to the longitudinal centerline of the shaft. Particularly for wrenches or ratchets that have a flexible head portion, the cost and complexity of designing the flexible head portion can be prohibitive. Thus, it may be desirable to provide improved designs that can be easy for operators to use, but also provide low cost and complexity for production and maintenance.

BRIEF SUMMARY OF SOME EXAMPLES

Some example embodiments may enable the provision of an improved sliding flexible interface between the head portion and the shaft of a hand tool (e.g., a wrench or ratchet).

In an example embodiment, a hand tool may be provided. The hand tool may include a head portion configured to interface with a fastener, a shaft having a grip portion at which an operator is enabled to hold the hand tool during operation, and a flexible interface configured to operably couple the shaft and the head portion in a locked state and an unlocked state, and to enable the head portion to pivot relative to the shaft about a pivot axis that extends substantially perpendicular to a direction of extension of the shaft. In the unlocked state, an angle of the head portion is pivotable relative to the pivot axis and, in the locked state, the angle of the head portion is fixed. The flexible interface includes a retention assembly and a locking assembly including an actuator. The actuator may be configured to move in a direction substantially perpendicular to the pivot axis to operate the locking assembly to transition between the locked state and the unlocked state, and configured to move in a direction substantially parallel to the pivot axis to operate the retention assembly to retain hand tool in the unlocked state.

In another example embodiment, a flexible interface for a hand tool may be provided. The flexible interface may operably couple a head portion and a shaft of the hand tool. The flexible interface may include a locking assembly and a retention assembly. The locking assembly may include an actuator having a locked state for the hand tool and an unlocked state for the hand tool. In the unlocked state, an angle of the head portion may be pivotable relative to a pivot axis substantially perpendicular to a direction of extension of the shaft and, in the locked state, the angle of the head portion is fixed. The actuator may be configured to move in a direction substantially perpendicular to the pivot axis to operate the locking assembly to transition between the locked state and the unlocked state, and configured to move in a direction substantially parallel to the pivot axis to operate the retention assembly to retain hand tool in the unlocked state.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 3A illustrates an exploded view of some parts of the wrench of FIG. 2A according to an example embodiment;

FIG. 3B illustrates an exploded view of some parts of the wrench of FIG. 2B according to an example embodiment;

FIG. 8A is a cross section view of an alternative structure for a flexible interface according to an example embodiment;

FIG. 8B shows a side view of the actuator, neck and locking pin of the alternative structure according to an example embodiment;

DETAILED DESCRIPTION

Figure 1:
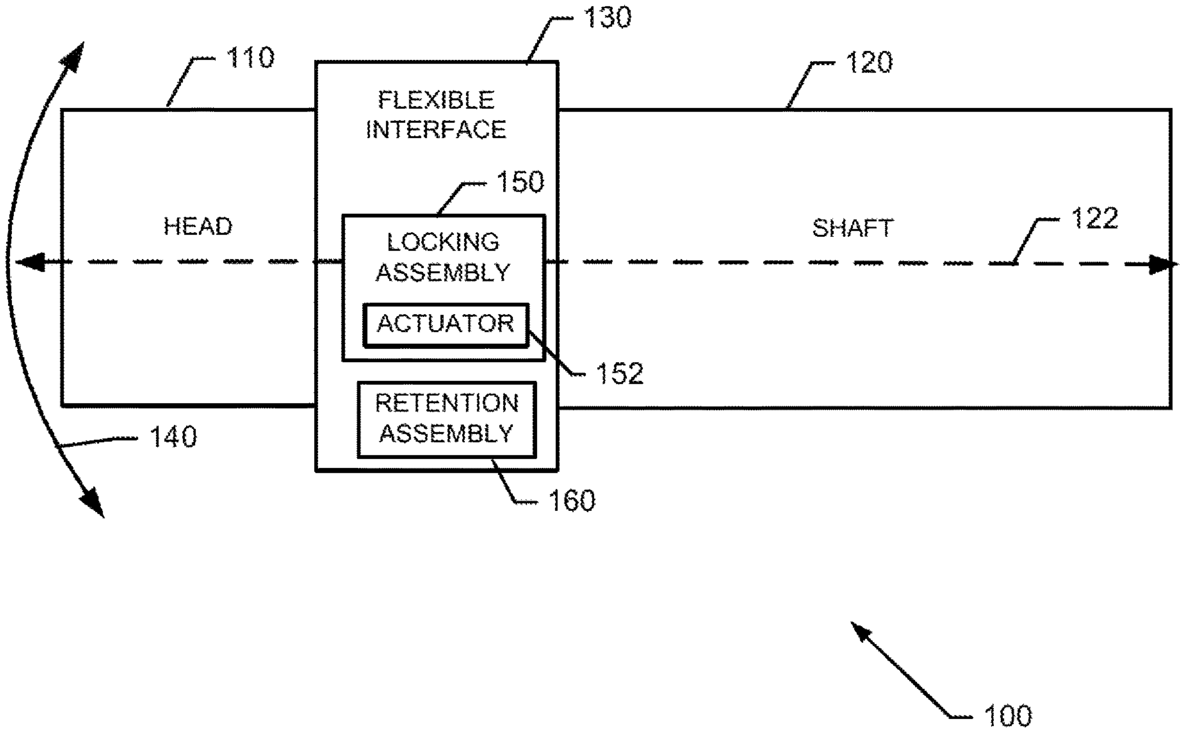
FIG. 1 illustrates a block diagram of a hand tool in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to improvements to the design of a hand tool with a flexible head portion. FIGS. 1-7 show various views or portions of one such example embodiment. In this regard, FIG. 1 illustrates a block diagram of a hand tool 100 with a flexible head 110 (or head portion). The head 110 is operably coupled to a shaft 120 that has a longitudinal centerline 122 via a flexible interface 130. The flexible interface 130 is structured to allow the head 110 to be pivoted about an axis that extends substantially perpendicular to the longitudinal centerline 122 either upward or downward as shown by double arrow 140. The head 110 may be aligned with the longitudinal centerline 122 (i.e., not pivoted), or may be pivoted out of alignment with the longitudinal centerline 122 either upwardly or downwardly to enable the operator to define an amount of angular difference that may be provided between the longitudinal centerline 122 and the head 110, and therefore define the angular difference between the head 110 and the shaft 120. When the head 110 is pivoted out of alignment with the shaft 120, the hand tool 100 may fit in smaller areas or provide a more convenient or comfortable grip for the operator.

In an example embodiment, the flexible interface 130 may further include a locking assembly 150 that is structured to define a locked state in which the head 110 is retained at a fixed angle relative to the shaft 120. The fixed angle may be any angle in the full range of possible angles from no pivoting (i.e., alignment with the shaft 120) to maximum angular difference from the shaft 120. The locking assembly 150 may also have an unlocked state in which the head 110 is free to pivot relative to the shaft 120. As shown in FIG. 1, an actuator 152 may be provided to transition the locking assembly 150 between the locked and the unlocked state.

The unlocked state may, for many tools, be merely a transient state. In this regard, many tools may provide biasing to place the locking assembly (if included) in the locked state. Thus, for example, using the actuator 152 in connection with a conventional hand tool with a flexible head would typically keep the tool in the unlocked state only for as long as the operator manually holds the actuator 152 against the biasing provided. However, the hand tool 100 of an example embodiment may include a retention assembly 160 that is configured to enable the locking assembly 150 (and/or the actuator 152) to be retained in the unlocked state. In this regard, some example embodiments (although not all) may design the actuator 152 to be biased to return to the locked state, thereby making the unlocked state temporary (or requiring operator interaction in order to maintain the unlocked state). Accordingly, in some cases, the actuator 152 may be operable to move in a direction substantially parallel to the longitudinal centerline 122 to transition between the locked state and the unlocked state, and may move in a direction substantially perpendicular to the longitudinal centerline 122 to operate the retention assembly 160 to retain hand tool 100 in the unlocked state.

As can be appreciated from the descriptions above, the flexible interface 130 may take a number of forms from a structural perspective. Thus, the locking assembly 150, the actuator 152 and the retention assembly 160 may also take a number of different forms. FIGS. 2-7 illustrate various views of one example structure that may be used to embody the flexible interface 150 of one example embodiment.

Figure 2A:
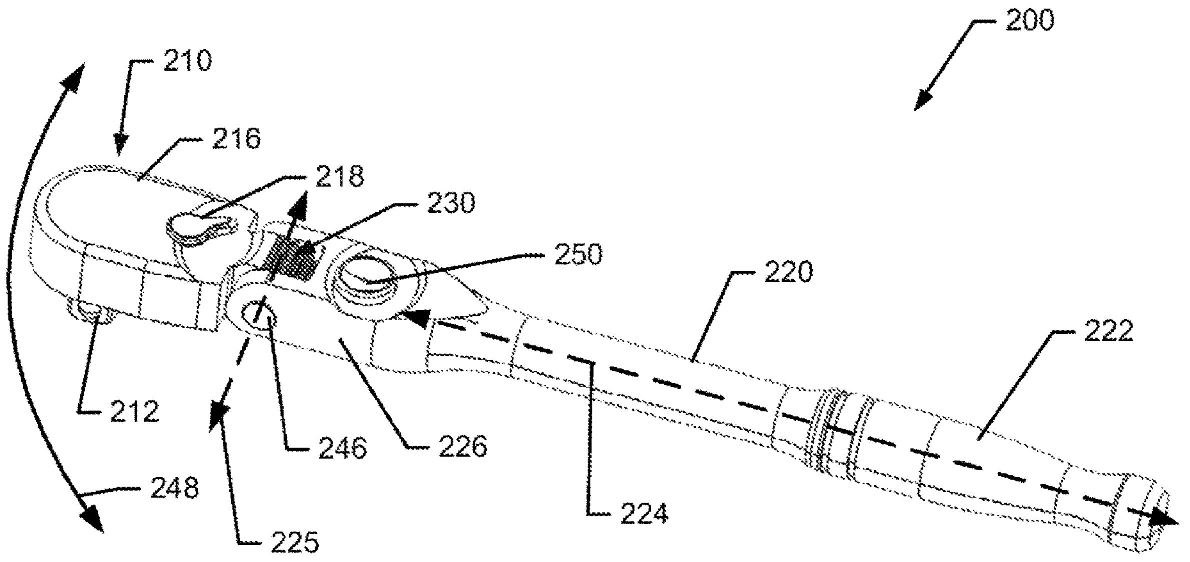
FIG. 2A illustrates a perspective view of a wrench as one example of the hand tool of FIG. 1 according to an example embodiment.
Figure 2B:
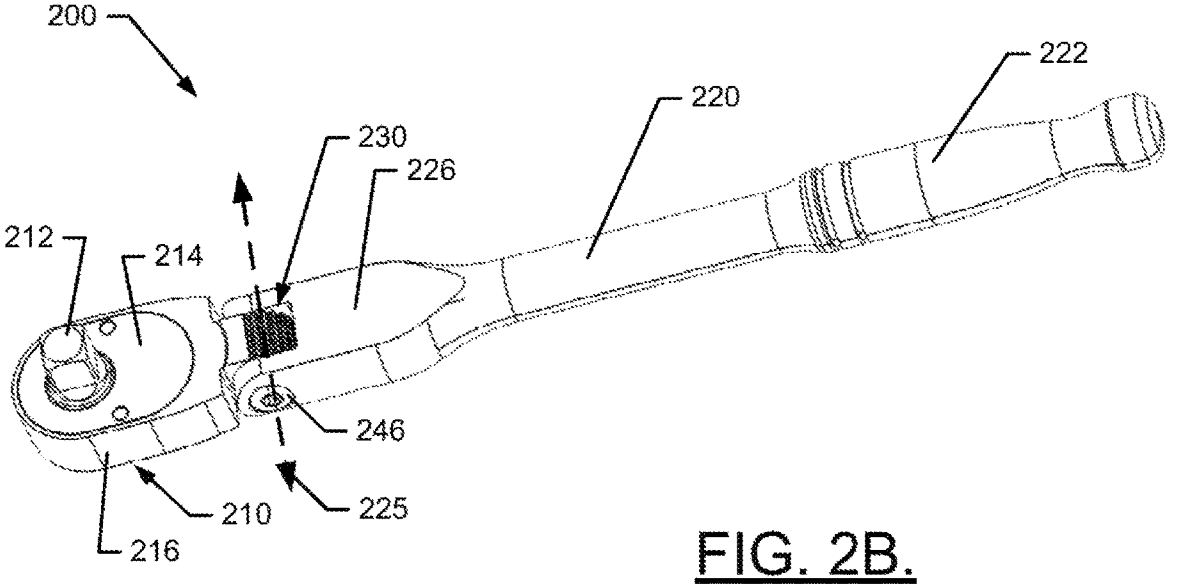
FIG. 2B illustrates a different perspective view of the wrench of FIG. 2A according to an example embodiment.
Figure 4:
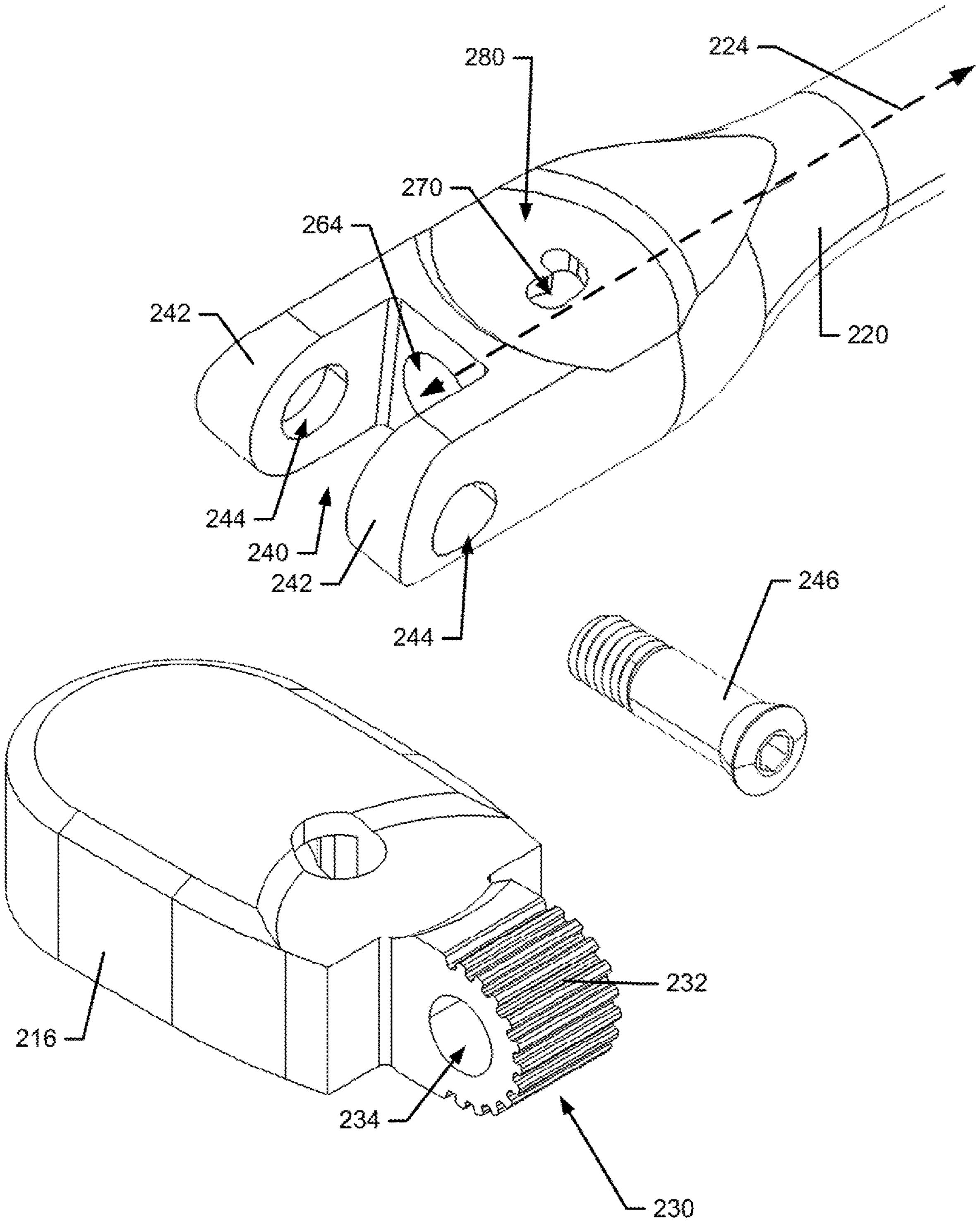
FIG. 4 illustrates some portions of a flexible interface according to an example embodiment.

FIG. 2, which is defined by FIGS. 2A and 2B, illustrates different perspective views (i.e., back and front views, respectively) of a hand tool 200, which operates as one example of the hand tool 100 of FIG. 1. FIG. 3, which is defined by FIGS. 3A and 3B, illustrates corresponding exploded views for the perspectives shown in FIGS. 2A and 2B for some components of the hand tool 200. As shown in FIGS. 2 and 3, the hand tool 200 may include a head portion 210 (e.g., a ratchet head), which includes a driving member 212 (e.g., a drive square), a ratchet assembly 214 housed in a body 216 of the head portion 210, and a direction selector 218. The direction selector 218 may be used to select which direction torque can be applied versus which direction torque is not applied when ratcheting is enabled via the ratchet assembly 214. The driving member 212 may interface with a selected socket that actually interfaces with the fastener that is being turned or gripped. Various internal components of the head portion 210, and specifically the ratchet assembly 214, may control the ratcheting capability, and are outside the scope of this disclosure. However, it should also be appreciated that example embodiments could be practiced in a context in which ratcheting is or is not included. In other words, the head portion 210 could be replaced with either an open-end wrench head or a box-end wrench head (with or without ratchet capabilities).

The head portion 210 may be operably coupled to a first end (e.g., a proximal end) of a shaft 220. A handle portion 222 (or grip portion) may be disposed proximate to a second end (e.g., a distal end) of the shaft 220. A longitudinal centerline 224 or axis of the shaft 220 may also form a longitudinal centerline or axis of the hand tool 200. The shaft 220, the head portion 210, and various other portions of the hand tool 200 may be made of steel or another extremely strong material. The handle portion 222 may be made of steel as well, and have a knurled outer periphery that enhances the ability of the operator to grip the shaft 220 effectively. However, the handle portion 222 could alternatively be made of a different material that is slid over the shaft 220 in some cases. Although not required, the first end of the shaft 220 may have a transition region 226 that may be shaped to have a width and a thickness that is substantially similar to a width and a thickness of the body 216 of the head portion 210. Thus, for example, the transition region 226 may be substantially flat on top and bottom sides thereof, and may be wider than other portions of the shaft 220.

The first end of the shaft 220 (i.e., the transition region 226) may be operably (and pivotally) attached to the head portion 210 via structures that form an example of the flexible interface 130 of FIG. 1. In this regard, some portions of the flexible interface 130 are shown in greater detail in FIGS. 4 and 5 (which is a cross section view). As shown in FIGS. 2-5, the body 216 of the head portion 210 may include a neck 230 having a proximal end (relative to the shaft 220) that is rounded and includes a plurality of teeth 232 (or other projections or ridges) around a periphery of the rounded portion of the proximal end of the neck 230. A pivot channel 234 may be formed in the neck 230, and may extend substantially perpendicular to the longitudinal centerline 224 of the shaft 220. The rounded portion (and therefore the teeth 232) on the neck 230 may be substantially equidistant from a center (or pivot axis 225) of the pivot channel 234.

Meanwhile, the transition region 226 may include a receiving slot 240 formed between two shoulder members 242 that extend substantially parallel to the direction of extension of the longitudinal centerline 224 on opposite sides of the receiving slot 240. The shoulder members 242 may each include a pivot orifice 244 formed therein, and the pivot orifices 244 of each shoulder member 242 may align with each other and extend substantially perpendicular to the direction of extension of the longitudinal centerline 224. A diameter of the pivot orifices 244 may be substantially equal to a diameter of the pivot channel 234. The neck 230 may be inserted into the receiving slot 240, between the shoulder members 242, and the pivot orifices 244 may be aligned with the pivot channel 234. A pivot pin 246 may then be passed through each of the pivot orifices 244 and the pivot channel 234.

The pivot pin 246 may have a diameter slightly smaller than the diameters of the pivot orifices 244 and the pivot channel 234 to permit the head portion 210 to pivot freely about the pivot pin 246. Although other fixing methods may be employed, in one example embodiment, the pivot pin 246 may have a threaded connection to just one of the pivot orifices 244. A longitudinal centerline of the pivot pin 246 may form the pivot axis 225 about which the head portion 210 is then allowed to pivot relative to the shaft 220. As shown in FIG. 2, the head portion 210 may pivot out of alignment with the longitudinal centerline 224 of the shaft either upwardly or downwardly about the pivot pin 246 in directions shown by arrow 248.

Thus, in general terms, the neck 230, the shoulder members 242 and the pivot pin 246 may form portions of the flexible interface 130 shown in FIG. 1. However, as noted above, example embodiments may further provide the flexible interface 130 of FIG. 1 with the capability to alternately unlock and lock the head portion 210 in relation to the shaft 220. The exploded view of FIG. 3, the cross section view of FIG. 5, and the various isolated component views of FIG. 6 illustrate components that may form the locking assembly 150 and retention assembly 160 of FIG. 1.

Figure 5:
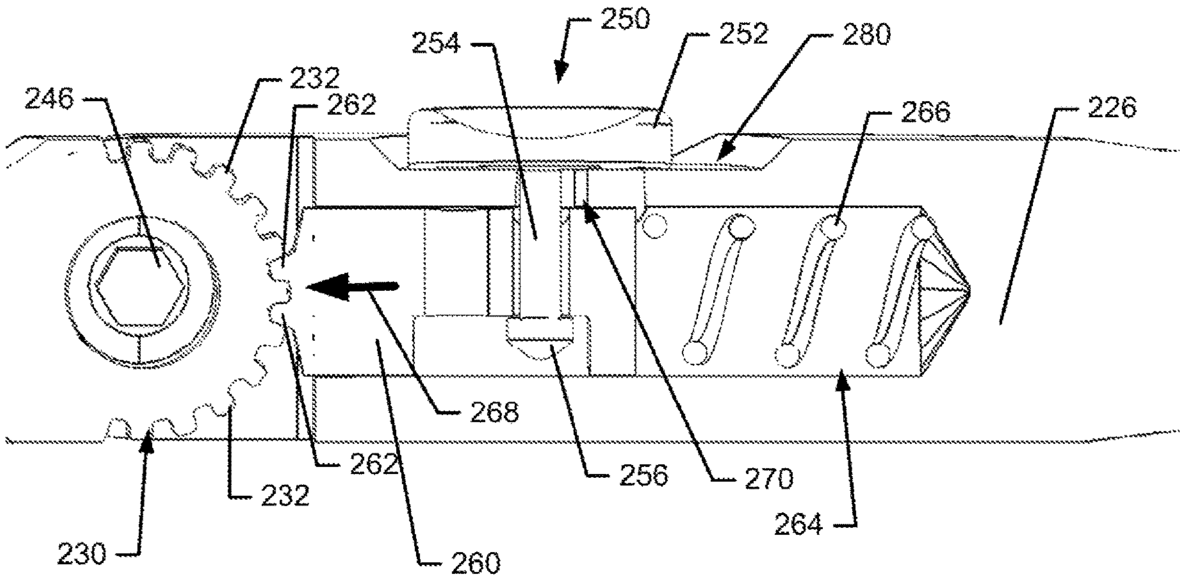
FIG. 5 illustrates a cross section view of the flexible interface according to an example embodiment.

An actuator 250 (or button), shown in FIGS. 2-7 is one example of the actuator 152 of FIG. 1. The actuator 250 may include a slide member 252, a button shaft 254 and a retaining element 256 as shown in FIG. 5. In this regard, the button shaft 254 may be a substantially cylindrical body that extends between the slide member 252 and the retaining element 256 in some cases. Moreover, in some embodiments, the button shaft 254 may be a screw and a head of the screw may either seat within the slide member 252 or the retaining element 256. The retaining element 256 and the slide member 252 may each have diameters that are larger than a diameter of the button shaft 254. In some cases, the slide member 252 may also have a diameter that is significantly larger than a diameter of the retaining element 256.

The slide member 252 may be located at a top surface or portion of the transition region 226, and the button shaft 254 may extend into the transition region 226 to engage a locking pin 260. Thus, the actuator 250 may interface with the locking pin 260, which includes one or more engagement projections 262 that selectively engage the teeth 232 of the rounded portion of the neck 230 to transition the hand tool 200 between the locked state and the unlocked state. In an example embodiment, the locking pin 260 may be disposed in a locking pin channel 264 formed in the transition region 226 of the shaft 220. The locking pin channel 264 may extend from the receiving slot 240 rearward along the longitudinal centerline 224 toward an actuator cavity 270 formed in the top surface of the transition region 226. The actuator 250 may therefore be movable (between locked and unlocked positions, as well as a transition position) within the actuator cavity 270 based on the operator repositioning the slide member 252. The portion of the top surface of the transition region 226 over which the actuator 250 (and particularly the slide member 252) may slide, may be referred to as a slide zone 280. The slide zone 280 may be flat and, in some cases, may be slightly recessed relative to the rest of the top surface of the transition region 226.

In some embodiments, the locking pin 260 may be biased toward engagement with the neck 230 by a biasing member (e.g., locking spring 266). In this regard, the engagement projections 262 may be urged into contact with the teeth 232 by the force exerted by the locking spring 266 in a direction toward the neck 230 as shown by arrow 268 in FIG. 5. As such, the locking pin 260 may move within the locking pin channel 264 in the direction of arrow 268 responsive to force from the locking spring 266, and in a direction opposite that of arrow 268 when forces overcoming the biasing force of the locking spring 266 (exerted by the operator) push the locking pin 260 in the other direction (opposite arrow 268).

Figure 6A:
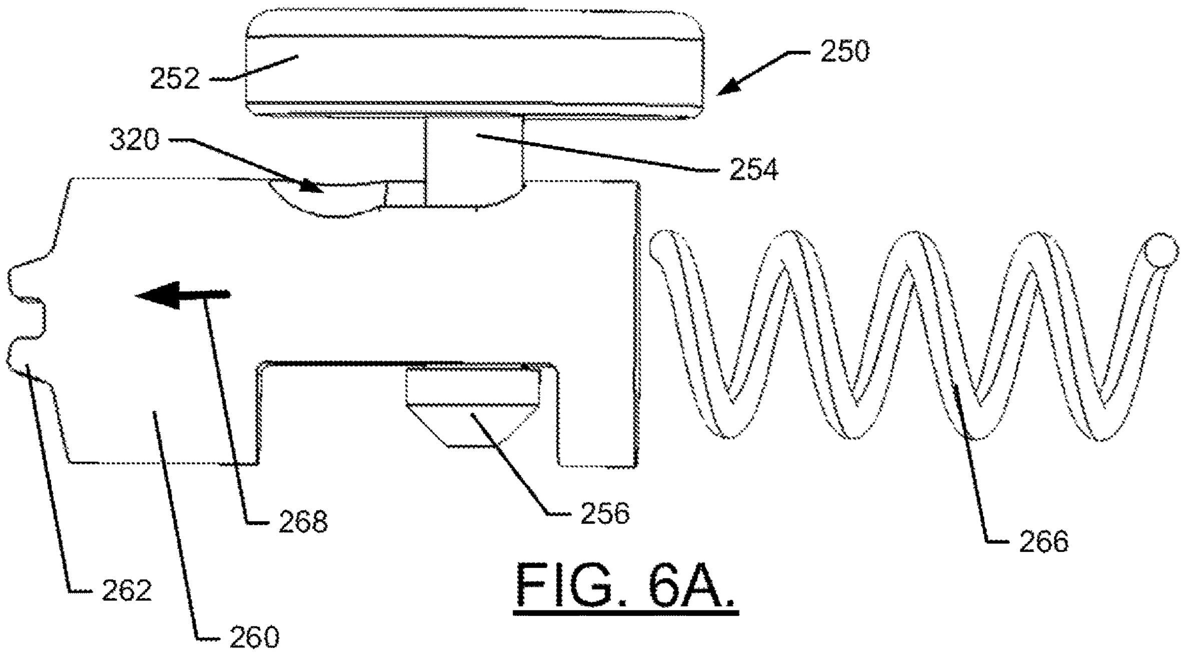
FIG. 6A illustrates a side view of portions of a locking assembly and a retention assembly associated with an actuator of the flexible interface in the locked state according to an example embodiment.
Figure 6B:
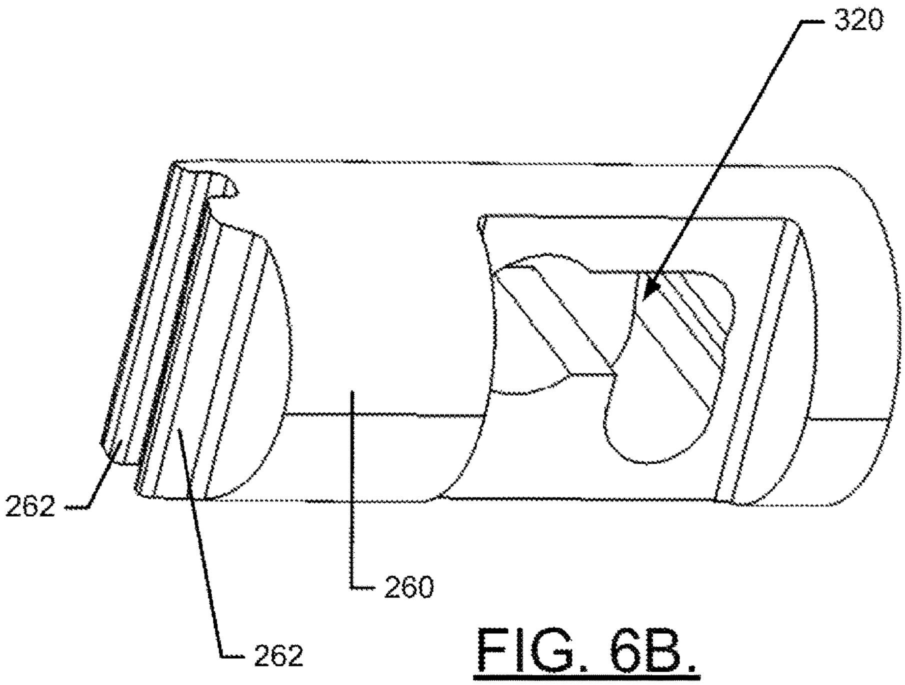
FIG. 6B illustrates a perspective view of a locking pin according to an example embodiment.
Figure 6C:
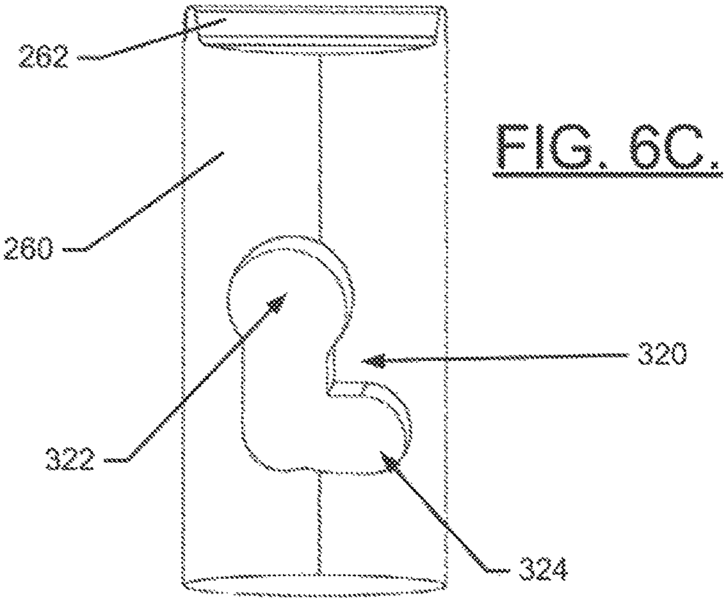
FIG. 6C is a top view of the locking pin according to an example embodiment.
Figure 6D:
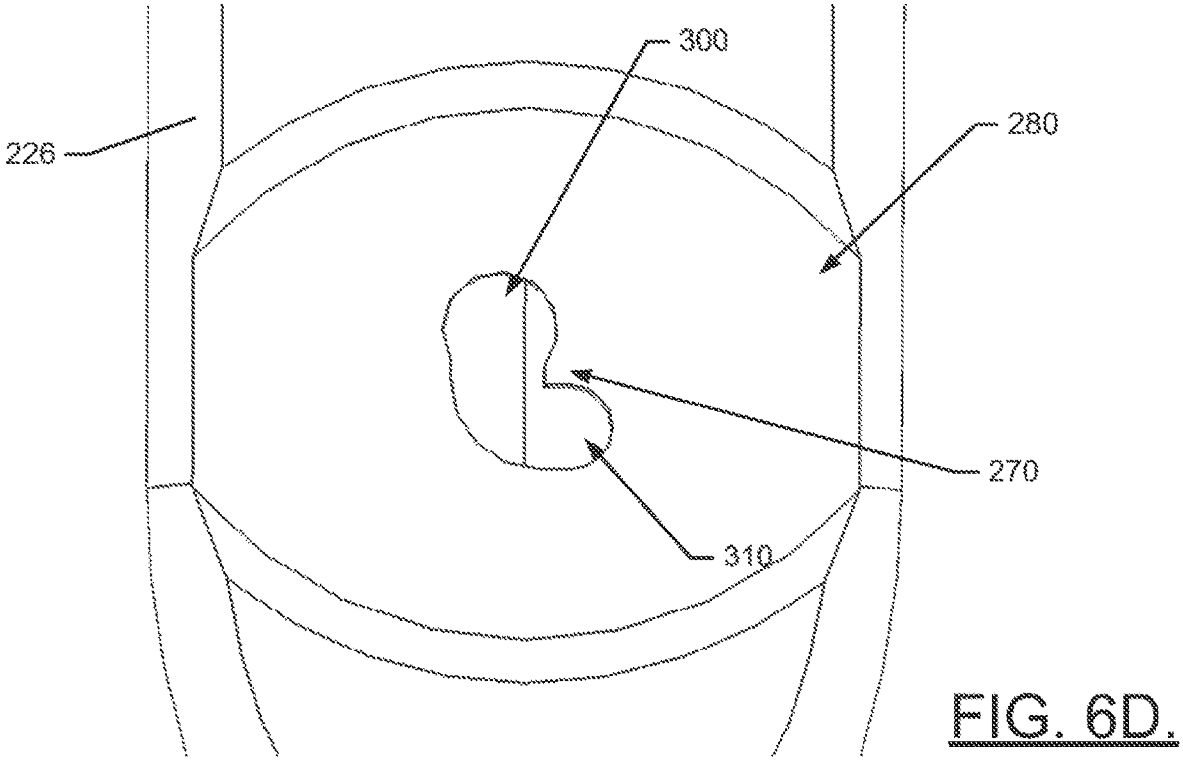
FIG. 6D illustrates a top view of a slide zone in a transition region of a hand tool according to an example embodiment.

FIG. 6, which is defined by FIGS. 6A, 6B, 6C and 6D, shows various views of components of the locking assembly 150 and retention assembly 160 of FIG. 1. In this regard, FIG. 6A shows a side view of the locking pin 260 engaged with the actuator 250 and the locking spring 266. FIG. 6B shows a bottom perspective view of the locking pin 260. Meanwhile, FIGS. 6C and 6D show top views of the locking pin 260 and the slide zone 280 to facilitate comparison of the channels formed therein.

Referring to FIG. 6, it can be appreciated that the locking spring 266 is situated to consistently urge the locking pin 260 in the direction of arrow 268 and various perspective views of the locking pin 260. As shown best in FIG. 6D, the actuator cavity 270 may be an L shaped cavity formed in the transition region 226 to pass from the slide zone 280 through to the locking pin channel 264. The actuator cavity 270 may have an L shape such that part of the actuator cavity 270 extends parallel (and aligned with) the longitudinal centerline 224, and part of the actuator cavity 270 extends substantially perpendicular to the longitudinal centerline 224. In this regard, the actuator cavity 270 may include two perpendicular channels comprising a locking channel 300, which extends parallel (and aligned with) the longitudinal centerline 224, and a retaining channel 310, which extends substantially perpendicular to the direction of extension of the locking channel 300 and to the longitudinal centerline 224.

Meanwhile, as best shown in FIG. 6C, but also visible in FIG. 6B, the locking pin 260 also includes an L shaped channel or slot (e.g., actuation slot 320) formed therein. The actuation slot 320 may have a similar shape to that of the actuator cavity 270 in that the actuation slot 320 includes two perpendicular channels comprising a locking slot 322, which extends parallel (and aligned with) the longitudinal centerline 224, and a retaining slot 324, which extends substantially perpendicular to the direction of extension of the locking slot 322 and to the longitudinal centerline 224.

Figure 7:
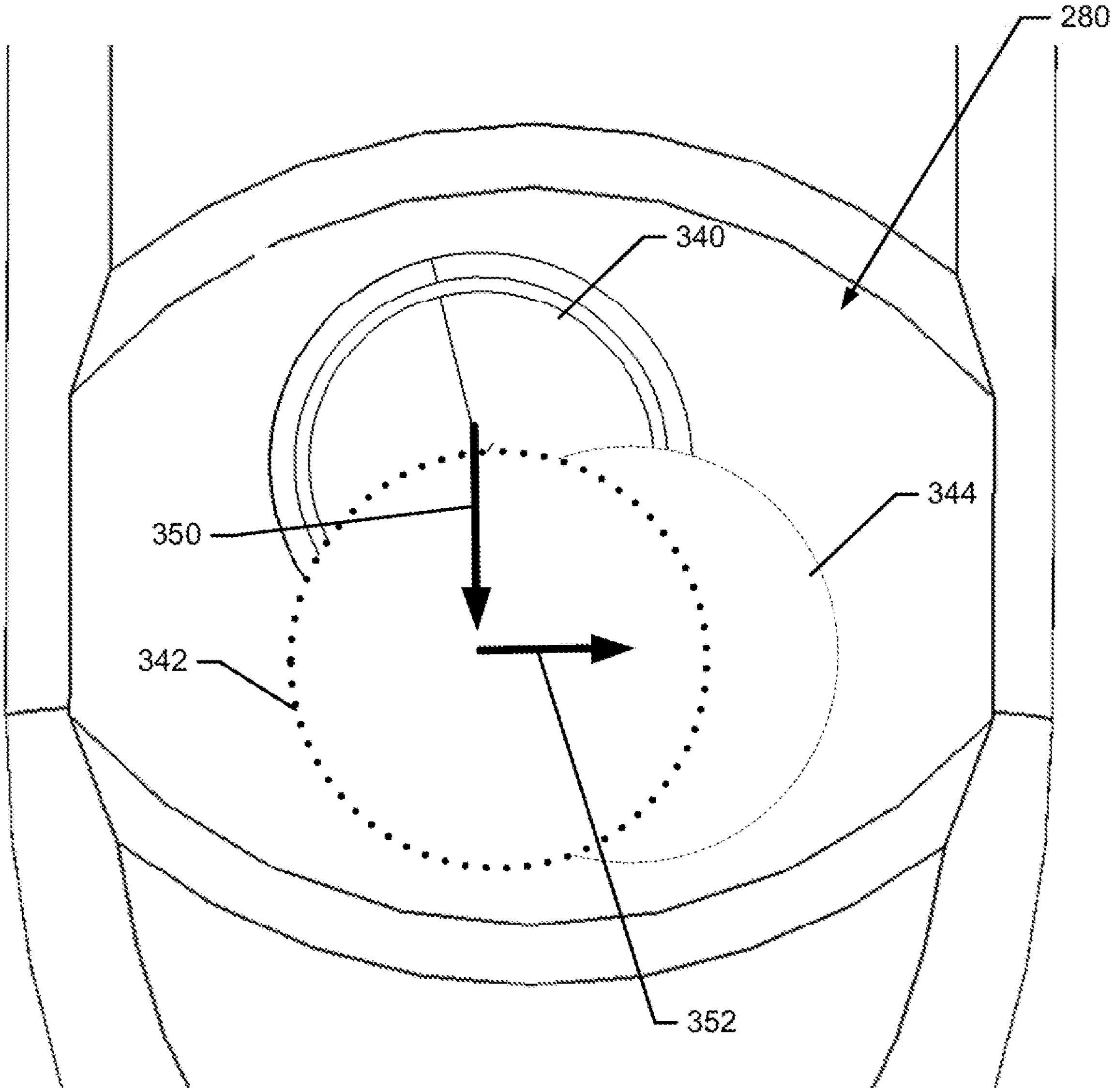
FIG. 7 illustrates an actuator in various positions corresponding to the locked and unlocked states of an example embodiment.

FIG. 7 illustrates a top view of the slide zone 280 with the actuator 250 in three different positions. Operation of the actuator 250 to transition from a locked position 340 to an transient unlocked position 342 and a retained unlocked position 344 will now be described in reference to FIGS. 5-7. In this regard, when the actuator 250 is in the locked position 340, the button shaft 254 extends through each of the locking slot 322 and the locking channel 300, and is at a distal end of each of the locking slot 322 and the locking channel 300 (relative to the retaining slot 324 and retaining channel 310, respectively). As noted above, the locking spring 266 urges the locking pin 260 in the direction of arrow 268 to engage the engagement projections 262 with the teeth 232 preventing any rotation or pivoting of the head portion 210. The actuator 250 is considered to be in the locked position 340, and the hand tool 200 is in the locked state.

When the operator wishes to change the angle of the head portion 210, the operator may slide the actuator 250 in the direction of arrow 350 (i.e., parallel to the longitudinal centerline 224 and rearward relative to the head portion 210 and perpendicular to the pivot axis 225) to the transient unlocked position 342 of FIG. 7. This rearward movement causes the button shaft 254 to move rearward in the locking slot 322 and the locking channel 300 to then carry the locking pin 260 rearward (and in the direction of arrow 350) thereby compressing the locking spring 266. The engagement projections 262 also disengage from the teeth 232 to allow rotation or pivoting of the head portion 210 as described above. The actuator 250 is considered to be in the transient unlocked position 342, and the hand tool 200 is in the unlocked state. However, if the operator releases the actuator 250 from this position (i.e., the transient unlocked position 342), the locking spring 266 will release and urge the locking pin 260 forward in the direction of arrow 268 (i.e., opposite the direction of arrow 350) to engage the engagement projections 262 with the teeth 232 thereby returning the hand tool 200 to the locked state (and the actuator 250 to the locked position 340). Thus, the transient unlocked position 342 is transient due to the fact that the actuator 250 is configured to automatically revert to the locked position 340 unless manually retained in the transient unlocked position 342 by the operator.

All that being said, example embodiments do enable the operator to achieve the unlocked state in a stable and persistent way by providing the retained unlocked position 344. In this regard, when the operator moves the actuator 250 perpendicular to the longitudinal centerline 244 (e.g., to the right in this example) in the direction of arrow 352, the button shaft 254 moves in the retaining channel 310 and in the retaining slot 324. The operator can then release the actuator 250 and the force of the locking spring 266 will again urge the locking pin 260 in the direction of arrow 268. However, since the button shaft 254 is in the retaining channel 310 and in the retaining slot 324, the locking pin 260 is merely retained in its position in the locking pin channel 264 instead of moving forward in the direction of arrow 268. As such, the locking spring 266 cannot achieve engagement between the engagement projections 262 and the teeth 232 so that the head portion 210 stays flexible and pivotable relative to the shaft 220. The unlocked state is therefore non-transient and the actuator 250 stays in the unlocked position (i.e., is retained there) until the operator manually moves the actuator 250 to the transient unlocked position 342 (or directly to the locked position 340). As noted above, the operator can take the actuator 250 to the transient unlocked position 342 and release the actuator 250, and the locking spring 266 will urge the locking pin 260 forward to achieve the locked position 340 automatically.

Figure 8C:
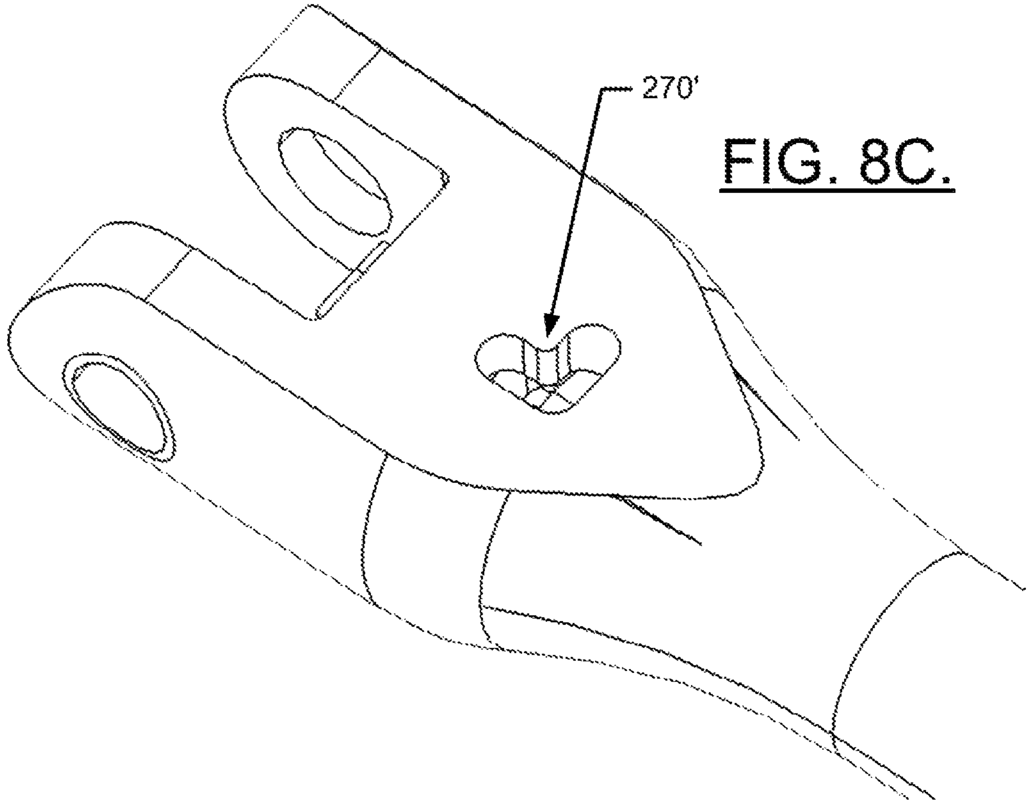
FIG. 8C is a perspective view of a transition region of the hand tool showing an alternative actuator cavity in accordance with an example embodiment.
Figure 8D:
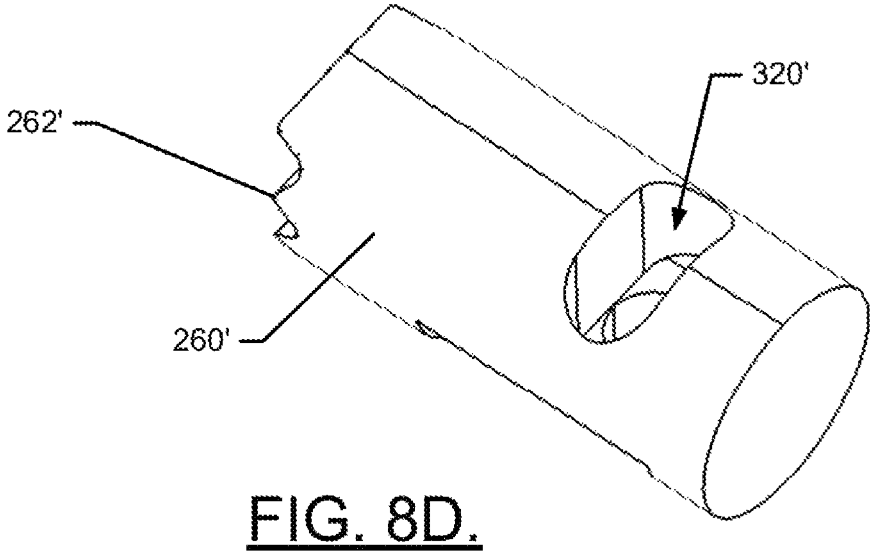
FIG. 8D illustrates a perspective view of a locking pin in accordance with an example embodiment.

As noted above, the structures shown in FIGS. 2-7 are merely examples of one way to embody the functions described in reference to FIG. 1. FIG. 8 illustrates slightly different structures that could be used to achieve the same purposes. In this regard, FIG. 8, which is defined by FIGS. 8A, 8B, 8C and 8D, shows a structure that eliminates the locking spring 266 to eliminate the potential transient nature described above whereby automatic return to the locked state is achievable. Thus, for example, the structures and functioning of the same for components of FIG. 8 may be similar to those described above, except for a requirement for user action (i.e., no automated movement) to transition between the locked state and the unlocked state in a retained nature.

FIG. 8A is a cross section view of a hand tool similar to that of FIGS. 2-7, but using slightly different structures to embody the retention assembly and/or locking assembly. FIG. 8B isolates the locking pin 260' and actuator 250' in greater detail. FIG. 8C shoes a perspective view of the locking channel 270', and FIG. 8D illustrates a perspective view of the actuation slot 320' in the actuator 250'.

Referring now to FIG. 8, it can be appreciated that the actuator 250', the locking pin 260', the locking channel 270', and the actuation slot 320' are each similar to the corresponding components described above in form and/or function with two exceptions. Although there are or may be only small physical changes in the structures of these components, they may otherwise function in similar manner to the descriptions provided above except for the locking pin 260' due to the different shape of the actuation slot 320'. In this regard, the actuation slot 320' of FIG. 8 is not L shaped, but instead extends only perpendicular to the longitudinal centerline 244. As noted above, the other difference is that the locking spring 266 is removed entirely. Due to the removal of the locking spring 266, movement of the actuator 250' in the direction of arrow 350 (see FIG. 7) moves the actuator 250' such that the engagement projections 262' disengage with the teeth 232 thereby causing the hand tool 200 to be in the unlocked state. Meanwhile, movement of the actuator 250' in a direction opposite arrow 350 engages the engagement projections 262' with the teeth 232 to transition the hand tool 200 to the locked state. The main difference to the example described in reference to FIGS. 2-7 is that there is no spring to urge the locking pin 260' forward toward engagement with the neck 230. Instead, the operator may merely shift the actuator 250' to the right (in the direction of arrow 352) to move the button shaft 254' within the retaining channel and the retaining slot. The hand tool 200 is then retained in the unlocked state. As such, no automatic movements are provided, and only operator intent and corresponding action to change the state of the hand tool 200 is used to make state changes.

As can be appreciated from the example of FIGS. 1-7, example embodiments may define a hand tool (i.e., a wrench or ratchet) with various unique features including a flexible interface. The flexible interface may operably couple a head portion and a shaft of the hand tool. The flexible interface may include a retention assembly and a locking assembly including an actuator defining a locked state and an unlocked state for the hand tool. In the unlocked state, an angle of the head portion may be pivotable relative to a pivot axis substantially perpendicular to a direction of extension of the shaft and, in the locked state, the angle of the head portion is fixed. The actuator may be configured to move in a direction substantially perpendicular to the pivot axis to operate the locking assembly to transition between the locked state and the unlocked state, and configured to move in a direction substantially parallel to the pivot axis to operate the retention assembly to retain hand tool in the unlocked state.

The hand tool and/or its components such as the flexible interface may include a number of modifications, augmentations, or optional additions, some of which are described herein. These modifications, augmentations or optional additions may be included in any combination. For example, the actuator may include a slide button that is disposed in an actuator cavity that extends through a proximal end of the shaft relative to the head portion substantially perpendicular to the pivot axis. In an example embodiment, the actuator cavity may be an L shaped cavity having a locking channel extending in the direction substantially perpendicular to the pivot axis and also having a retaining channel extending in the direction substantially parallel to the pivot axis. In some cases, the locking assembly may include a locking pin disposed in a locking pin channel extending substantially perpendicular to the pivot axis. The locking pin may be movable in the locking pin channel to either place the locking pin into contact with a neck of the head portion to prevent the head portion from pivoting and defining the locked state or remove the locking pin from contact with the neck to enable the head portion to pivot and defining the unlocked state. In an example embodiment, the locking assembly may further include a locking spring disposed in the locking pin channel. The locking spring may urge the locking pin into contact with the neck when the actuator is aligned for movement in the locking channel. The locking spring may be prevented from causing contact between the locking pin and the neck when the actuator is moved into the retaining channel. In some cases, the actuator may be in a locked position corresponding to the locked state when the actuator is in the locking channel and the locking spring causes contact between the locking pin and the neck. The actuator may be in a transient unlocked position corresponding to the unlocked state when manually held against a force of the locking spring while in the locking channel, and may be in a retained unlocked position corresponding to the unlocked state when moved in the retaining channel away from the locking channel. In an example embodiment, the locking pin may include an actuation slot having a locking channel that extends substantially parallel to the locking channel and a retaining slot that extends substantially parallel to the retaining channel. In some cases, the neck may extend into a reception slot formed at the proximal end of the shaft. The neck may have a rounded periphery with a plurality of teeth, and the locking pin may include one or more engagement protrusions configured to engage the teeth of the neck. In an example embodiment, the locking pin may include an actuation slot comprising a retaining slot that extends substantially parallel to the retaining channel. In some cases, the locking assembly and retention assembly may be manually operated to transition between the locked state and unlocked state.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A hand tool comprising: a head portion configured to interface with a fastener;

a shaft having a grip portion at which an operator is enabled to hold the hand tool during operation; and a flexible interface configured to operably couple the shaft and the head portion in a locked state and an unlocked state, and to enable the head portion to pivot relative to the shaft about a pivot axis that extends substantially perpendicular to a direction of extension of the shaft, wherein, in the unlocked state, an angle of the head portion is pivotable relative to the pivot axis and, in the locked state, the angle of the head portion is fixed, wherein the flexible interface comprises a retention assembly and a locking assembly including an actuator and a locking pin, wherein the actuator is disposed in an actuator cavity, the actuator cavity comprising a locking channel and a retaining channel, wherein the retaining channel extends in a direction substantially parallel to the pivot axis, wherein the actuator is configured to move in a direction substantially perpendicular to the pivot axis to operate the locking assembly to transition between the locked state and the unlocked state, and configured to move in the direction substantially parallel to the pivot axis to operate the retention assembly to retain hand tool in the unlocked state, and wherein the locking pin comprises an actuation slot comprising a retaining slot that extends substantially parallel to the retaining channel.

2. The hand tool of claim 1, wherein the actuator comprises a slide button that is disposed in the actuator cavity, the actuator cavity extending through a proximal end of the shaft relative to the head portion substantially perpendicular to the pivot axis.

3. The hand tool of claim 2, wherein the actuator cavity is an L shaped cavity having the locking channel extending in the direction substantially perpendicular to the pivot axis and the retaining channel.

4. The hand tool of claim 3, wherein the locking assembly comprises the locking pin disposed in a locking pin channel extending substantially perpendicular to the pivot axis, wherein the locking pin is movable in the locking pin channel to either place the locking pin into contact with a neck of the head portion to prevent the head portion from pivoting and defining the locked state or remove the locking pin from contact with the neck to enable the head portion to pivot and defining the unlocked state.

5. The hand tool of claim 4, wherein the locking assembly further comprises a locking spring disposed in the locking pin channel, wherein the locking spring urges the locking pin into contact with the neck when the actuator is aligned for movement in the locking channel, and wherein the locking spring is prevented from causing contact between the locking pin and the neck when the actuator is moved into the retaining channel.

6. The hand tool of claim 5, wherein the actuator is in a locked position corresponding to the locked state when the actuator is in the locking channel and the locking spring causes contact between the locking pin and the neck, wherein the actuator is in a transient unlocked position corresponding to the unlocked state when manually held against a force of the locking spring while in the locking channel, and wherein the actuator is in a retained unlocked position corresponding to the unlocked state when moved in the retaining channel away from the locking channel.

7. The hand tool of claim 6, wherein the locking pin comprises the actuation slot comprising a locking slot that extends substantially parallel to the locking channel and the retaining slot that extends substantially parallel to the retaining channel.

8. The hand tool of claim 7, wherein the neck extends into a reception slot formed at the proximal end of the shaft, the neck having a rounded periphery with a plurality of teeth, and wherein the locking pin comprises one or more engagement protrusions configured to engage the teeth of the neck.

9. The hand tool of claim 4, wherein the locking assembly and retention assembly are manually operated to transition between the locked state and unlocked state.

10. A flexible interface operably coupling a head portion and a shaft of a hand tool, the flexible interface comprising:

a locking assembly including a locking pin and an actuator movable to define a locked state for the hand tool and an unlocked state for the hand tool; and a retention assembly, wherein, in the unlocked state, an angle of the head portion is pivotable relative to a pivot axis that extends substantially perpendicular to a direction of extension of the shaft and, in the locked state, the angle of the head portion is fixed, wherein the actuator is disposed in an actuator cavity, the actuator cavity comprising a locking channel and a retaining channel, wherein the retaining channel extends in a direction substantially parallel to the pivot axis, wherein the actuator is configured to move in a direction substantially perpendicular to the pivot axis to operate the locking assembly to transition between the locked state and the unlocked state, and configured to move in the direction substantially parallel to the pivot axis to operate the retention assembly to retain hand tool in the unlocked state, and wherein the locking pin comprises an actuation slot comprising a retaining slot that extends substantially parallel to the retaining channel.

11. The flexible interface of claim 10, wherein the actuator comprises a slide button that is disposed in the actuator cavity, the actuator cavity extending through a proximal end of the shaft relative to the head portion substantially perpendicular to the pivot axis.

12. The flexible interface of claim 11, wherein the actuator cavity is an L shaped cavity having a locking channel extending in the direction substantially perpendicular to the pivot axis and the retaining channel.

13. The flexible interface of claim 12, wherein the locking assembly comprises the locking pin disposed in a locking pin channel extending substantially perpendicular to the pivot axis, wherein the locking pin is movable in the locking pin channel to either place the locking pin into contact with a neck of the head portion to prevent the head portion from pivoting and defining the locked state or remove the locking pin from contact with the neck to enable the head portion to pivot and defining the unlocked state.

14. The flexible interface of claim 13, wherein the locking assembly further comprises a locking spring disposed in the locking pin channel, wherein the locking spring urges the locking pin into contact with the neck when the actuator is aligned for movement in the locking channel, and wherein the locking spring is prevented from causing contact between the locking pin and the neck when the actuator is moved into the retaining channel.

15. The flexible interface of claim 14, wherein the actuator is in a locked position corresponding to the locked state when the actuator is in the locking channel and the locking spring causes contact between the locking pin and the neck, wherein the actuator is in a transient unlocked position corresponding to the unlocked state when manually held against a force of the locking spring while in the locking channel, and herein the actuator is in a retained unlocked position corresponding to the unlocked state when moved in the retaining channel away from the locking channel.

16. The flexible interface of claim 15, wherein the locking pin comprises the actuation slot comprising a locking slot that extends substantially parallel to the locking channel and the retaining slot that extends substantially parallel to the retaining channel.

17. The flexible interface of claim 16, wherein the neck extends into a reception slot formed at the proximal end of the shaft, the neck having a rounded periphery with a plurality of teeth, and wherein the locking pin comprises one or more engagement protrusions configured to engage the teeth of the neck.

18. The flexible interface of claim 13, wherein the locking assembly and retention assembly are manually operated to transition between the locked state and unlocked state.

* * * * *